United States Patent [19]

Mann

[11] Patent Number: 5,263,735
[45] Date of Patent: Nov. 23, 1993

[54] GOOSENECK TRAILER COUPLER

[76] Inventor: Fred W. Mann, 222 E. Front, Waterville, Kans. 66548

[21] Appl. No.: 814,491

[22] Filed: Dec. 30, 1991

[51] Int. Cl.$^5$ .............................................. B60D 1/06
[52] U.S. Cl. ................................................... 280/512
[58] Field of Search ......................... 280/511, 512, 507

[56] References Cited

U.S. PATENT DOCUMENTS

| | | | |
|---|---|---|---|
| 1,636,295 | 7/1927 | Dempsey | 280/513 |
| 2,542,643 | 2/1951 | Duncan | 280/513 |
| 3,374,268 | 3/1968 | Groves | 280/512 |
| 3,433,503 | 3/1969 | Davis . | |
| 3,659,876 | 5/1972 | Melton . | |
| 3,929,353 | 12/1975 | Burleson et al. . | |
| 4,176,853 | 12/1979 | Brock . | |
| 4,266,797 | 5/1981 | Rhodes . | |
| 4,283,073 | 8/1981 | Gostomshi et al. . | |
| 4,320,907 | 3/1982 | Eaton | 280/511 |

FOREIGN PATENT DOCUMENTS

| | | | |
|---|---|---|---|
| 8701608 | 2/1989 | Netherlands | 280/512 |
| 954260 | 8/1982 | U.S.S.R. | 280/512 |

*Primary Examiner*—David M. Mitchell
*Assistant Examiner*—Gary C. Hoge
*Attorney, Agent, or Firm*—Litman, McMahon & Brown

[57] ABSTRACT

An improved gooseneck trailer coupler device includes a body having an off-center, downwardly directed recessed socket in a bottom wall for receiving a ball-type hitch of a towing vehicle; a latching plate with an orifice spaced in slidable, rotational and abutting face-to-face relationship with the bottom wall such that the orifice aligns with the recessed socket in an unlatched configuration and misaligns with the recessed socket in a latch configuration confining the hitch to the recessed socket; a latching mechanism for positioning the latching plate in the latched and unlatched configurations; and a locking mechanism for automatically locking the latching plate in the latched configuration. A modified embodiment provides a latching plate extension pivotally connected to a bottom wall extension for positioning a latching plate having an orifice relative to a bottom wall having a recessed socket.

13 Claims, 2 Drawing Sheets

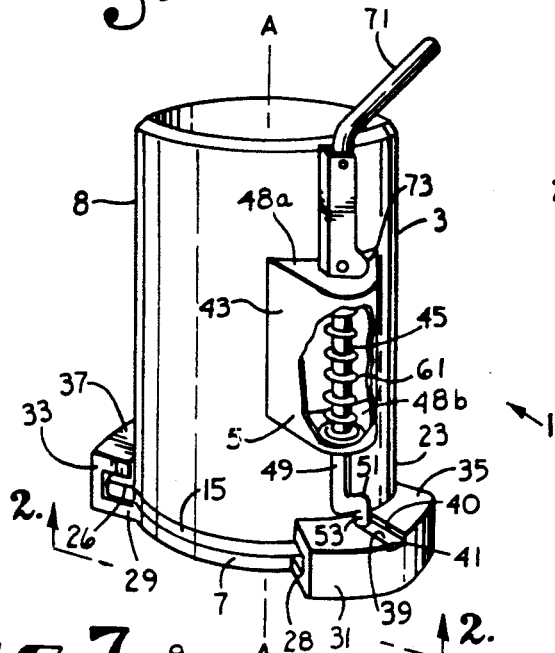
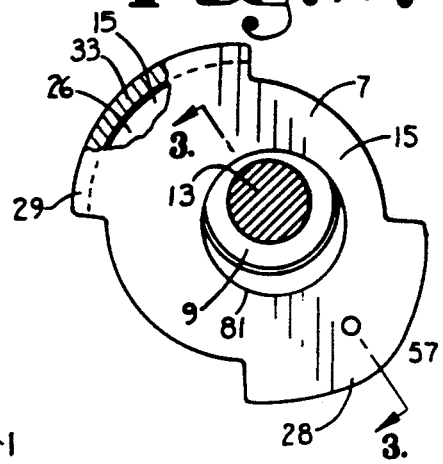
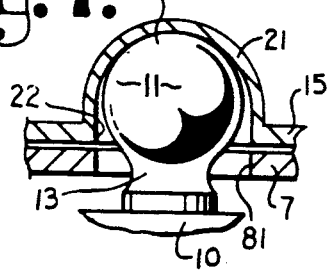
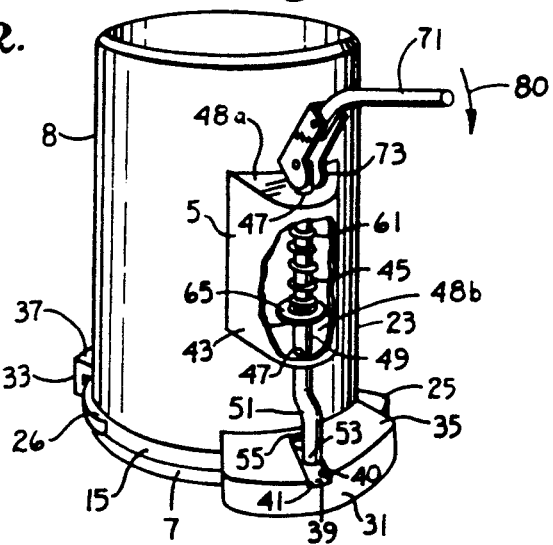
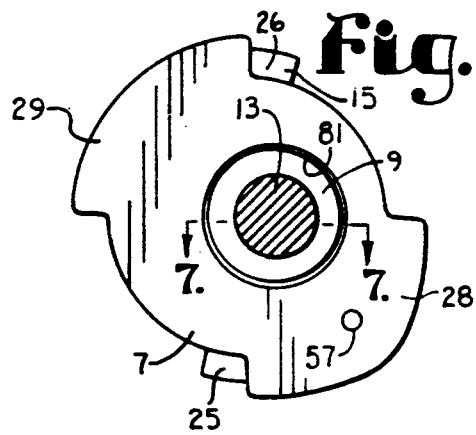

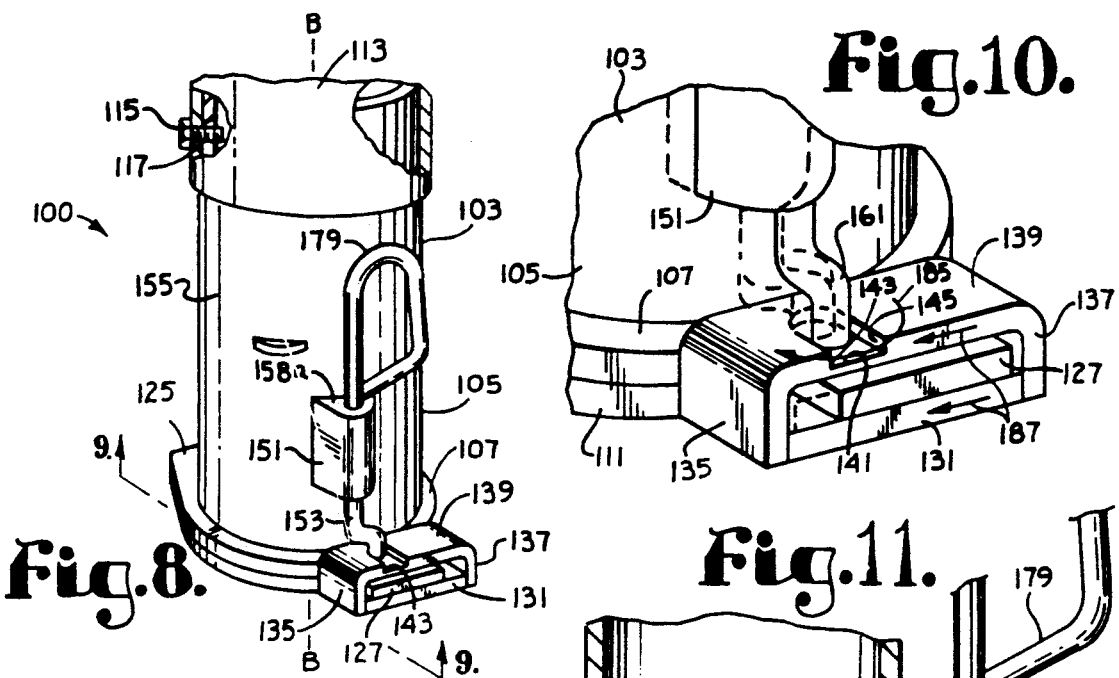

GOOSENECK TRAILER COUPLER

BACKGROUND OF THE INVENTION

1. Field of the Invention

The present invention relates to a coupler device and, particularly, without limitation, to a coupler device for connecting a gooseneck trailer to a ball-type hitch on a towing vehicle.

2. Description of the Related Art

Many coupling devices have been developed for providing a connection between a towing vehicle and a towed vehicle. Such connections usually involve a shaft-mounted, ball-type hitch, generally attached to the towing vehicle. A coupler attached to the towed vehicle cooperates with the hitch to complete the connection.

Unfortunately, many of the prior art couplers provide locking mechanisms which, in addition to a locking function, must also provide a supporting function and/or a pulling function. In the event of failure of one of those functions, then other functions involved therewith may also fail. Sometimes one of the functions of a multiple-functioned mechanism counteracts one or more of the functions. For example, if a locking mechanism also provides a supporting mechanism, the locking mechanism may be extremely difficult to operate and require substantial effort to lock or unlock.

Also, many of the prior art devices may be placed in a latched configuration but a separate, manual operation is required to lock the device in the latched configuration. If a person fails to take the extra step of locking the device, then a potentially dangerous situation may exist.

What is needed is a coupler device which has an independent locking mechanism which does not provide supporting or pulling functions and which automatically and positively locks the device in a latched position.

SUMMARY OF THE INVENTION

An improved gooseneck trailer coupler device is provided for connecting a towed vehicle to a towing vehicle. The device includes a body having a tubular portion with a generally vertically oriented axis and a bottom wall having a downwardly directed recessed socket with a socket opening. The bottom wall has a pair of opposing, radially outwardly extending bottom wall tabs.

The device also includes a latching plate having an orifice, a latching mechanism and a locking mechanism. The latching plate is spaced in generally rotatable and slidable, abutting face-to-face relationship with the bottom wall such that the orifice aligns with the socket opening in an unlatched configuration and misaligns with the socket opening in a latched configuration whereby a properly sized spherical portion of a ball-type hitch inserted in the recessed socket would be confined therein.

The latching plate has a pair of opposing tabs extending radially outwardly beyond the bottom wall tabs. Outer extremities of the bottom wall tabs are each connected to generally vertically extending spacing walls which are, in turn, connected to generally horizontally oriented topwalls which terminate in close proximity to the tubular portion such that the bottom wall tabs are slidable horizontally between the topwalls and the latching plate tabs.

The latching mechanism includes a plunger pivoted about, and axially displaceable along, a generally vertically oriented axis. The plunger has an elbow with a distal end which is slidable along a groove formed in an upper surface of one of the topwalls to position the device in the latched and unlatched configurations.

The locking mechanism includes a spring encircling the plunger which downwardly biases the elbow distal end, in conjunction with coaxial throughbores in the grooved topwall, the respective bottom wall tab and the respective latching plate tab, to automatically lock the latching plate in the latched configuration. A handle with a cam is provided to overcome the downward bias of the elbow distal end when withdrawing the distal end from the bores in order to position the device in the unlatched configuration.

A modified embodiment of an improved gooseneck trailer coupler device includes a bottom wall having a first guide tab and a first pivot tab and a latching plate having a second guide tab and a second pivot tab. The second pivot tab is pivotally connected to the first pivot tab about a generally vertically oriented axis.

OBJECTS AND ADVANTAGES OF THE INVENTION

Therefore, the principal objects and advantages of the present invention include: providing a coupler device for connecting a trailer to a towing vehicle; providing such a device which releasably secures the device to a ball hitch; providing such a device which has an independent locking mechanism which does not provide supporting or pulling functions; providing such a device which automatically locks in the latched configuration; providing such a device Which requires only minimal manual dexterity or strength to connect or disconnect the device from the ball hitch; providing such a device which requires only minimal skill to adjust, operate or maintain the device; providing such a device which requires minimal time to couple or uncouple a trailer; providing such a device which has rugged and relatively simple construction, and which is sturdy, compact, and durable; and to generally provide such a device which is efficient and reliable, economical to manufacture, safe to use, easy to couple and uncouple, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a gooseneck trailer coupler device, according to the present invention, With a portion cut away to reveal details thereof, showing the device locked in a latched configuration.

FIG. 2 is an enlarged, bottom plan view of the gooseneck trailer coupler device, taken generally along line 2—2 of FIG. 1, showing a portion cut away to reveal details thereof, showing the device in the latched configuration.

FIG. 3 is a further enlarged and fragmentary, cross-sectional view of the gooseneck trailer coupler device, taken generally along line 3—3 of FIG. 2, showing the device in the latched configuration.

FIG. 4 is a perspective view of the gooseneck trailer coupler device, showing the device in a position intermediate to an unlatched configuration and the latched configuration, with a portion cut away to reveal details thereof.

FIG. 5 is a perspective view of the gooseneck trailer coupler device, showing the device in the unlatched configuration.

FIG. 6 is an enlarged, bottom plan view of the gooseneck trailer coupler device, taken generally along line 6—6 of FIG. 5, showing the device in the unlatched configuration.

FIG. 7 is a further enlarged and fragmentary, cross-sectional view of the gooseneck trailer coupler device, taken generally along line 7—7 of FIG. 6, showing the device in the unlatched configuration.

FIG. 8 is a perspective view of a modified embodiment of a gooseneck trailer coupler device, according to the present invention, with portions cut away to reveal details thereof, showing the device locked in a latched configuration.

FIG. 9 is an enlarged bottom plan view of the modified gooseneck trailer coupler device, taken generally along line 9—9 of FIG. 8, with a portion cut away to reveal details thereof, showing the device in the latched configuration.

FIG. 10 is a further enlarged and fragmentary, perspective view of the modified gooseneck trailer coupler device in a position intermediate to an unlatched configuration and the latched configuration.

FIG. 11 is a further enlarged and fragmentary, cross-sectional view of the modified gooseneck trailer coupler device in the unlatched configuration.

FIG. 12 is an enlarged bottom plan view of the modified gooseneck trailer coupler device, with a portion cut away to reveal details thereof, showing the device in the unlatched configuration, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

1. Preferred Embodiment of the Invention

The reference numeral 1 generally refers to a gooseneck trailer coupler device according to the present invention, as shown in FIGS. 1-7. The device 1 includes a body 3 and latching means, such as a latching mechanism 5 in conjunction with a latching plate 7. It is to be understood that all elements of the device 1 are constructed of durable, rugged materials, such as heavy gauge steel or other suitable materials, in order to withstand the abusive environment sometimes encountered by trailer coupling devices.

The body 3 may be either a part of a drawbar of a gooseneck trailer (not shown) or separate therefrom and installed on such drawbar as a kit by methods commonly known in the art. The body 3 includes an upstanding tube 8. Although the tube 8 is shown as generally cylindrically shaped, it is to be understood that the tube 8 is not limited to any particular profile but may have a variety of different shapes and configurations as needed for a particular application. The tube 8 has sufficient vertical dimensions to extend sufficiently downwardly from such drawbar to engage a shaft-mounted hitch 9 fixedly secured to a towing vehicle 10, as hereinafter described. The hitch 9 has a ball or spherical portion 11 and a neck portion 13.

The body 3 has a bottom wall 15, which is oriented generally perpendicular to an axis AA of the tube 8. The bottom wall 15 is fixedly secured to the lower end of the tube 8, such as by welding or other suitable means. The bottom wall 15 has an upwardly recessed socket 21 with a downwardly directed socket opening 22 formed therein. The socket 21 is dimensioned such that the spherical portion 11 of the hitch 9 is slidably receivable vertically therein. The bottom wall 15 extends radially beyond a peripheral surface 23 of the tube 8 to form a pair of opposing first or bottom wall tabs 25 and 26.

Similarly, the latching plate 7, which is spaced in a generally face-to-face abutting relationship with the bottom wall 15, includes a pair of second or latching plate tabs 28 and 29 which extend radially outwardly beyond the tabs 25 and 26 to spacing walls 31 and 33, respectively, which are fixed secured to and extend generally upwardly from the tabs 28 and 29. Topwalls 35 and 37 are fixedly secured to upper extremities of the spacing walls 31 and 33, respectively, and extend generally horizontally therefrom to terminate in close proximity to the peripheral surface 23. The topwalls 35 and 37 are spaced from the tabs 28 and 29 such that the tabs 25 and 26 are slidably rotatable therebetween. The topwall 35 has a groove 39, with walls 40 and 41, which is generally radially oriented relative to the axis AA.

The latching mechanism 5 includes a housing 43 and a plunger 45. The housing 43 is fixedly secured to the peripheral surface 23 and has a pair of throughbores 47, one in an upper wall 48a thereof and the other in a lower wall 48b thereof, having a common axis which is generally parallel to the axis AA. The plunger 45 has a linear portion 49, which is slidably and rotatably secured in the bores 47, and an elbow portion 51. The elbow portion 51 is fixedly secured to the lower extremity of the linear portion 49 and has a distal end 53. The distal end 53 is dimensioned relative to the groove 39 such that the distal end 53 is easily slidable along the groove 39 between the groove walls 40 and 41.

A throughbore 55, positioned near the inner end of the groove 39, is generally coaxially aligned with a throughbore 57 in the latching plate 7. The tab 25 has a throughbore 58 which is coaxially aligned with the bores 55 and 57 as the device 1 is in a latched configuration, as shown in FIG. 1. The bores 55, 57 and 58 are dimensioned such that the elbow distal end 53 is easily slidable axially therethrough, locking the device 1 in the latched configuration. It is foreseen that only the bores 55 and 58 may be used to lock the device 1 in the latched configuration; in that case, the bore 57 would not be needed.

A compression spring 61 encircles the linear portion 49 within the housing 43 and is confined between the upper wall 48a of the housing 43 and a stop 65, which is fixedly secured to the linear portion 49 such that the plunger 45 is biased downwardly by the spring 61. A handle 71 is pivotally secured to an upper end of the plunger 45 such that as the handle 71 is displaced as shown in FIG. 1, the distal end 53 is disposed in the bores 55, 57 and 58 and the device 1 is locked in the latched configuration as aforesaid. The handle 71 has a cam 73 which cooperates with the upper wall 48a such that as the handle 71 is displaced to an unlocked position, as indicated by the arrow designated by the numeral 80 in FIG. 4, the plunger 45 is sufficiently urged upwardly, against the spring 61, whereby the distal end 53 is withdrawn from the bores 55, 57 and 58.

The latching plate 7 has an orifice 81 Which is dimensioned and spaced such that as the handle 71 is in a hitching or unlatched position, as shown in FIG. 5, the spherical portion 11 is insertable vertically through the orifice 81 to be received by the recessed socket 21, as shown in FIG. 7. Due to the off-center spacings of the orifice 81 and the recessed socket 21, as the handle 71 is rotated back to the latched position, the orifice 81 is mismatched with the recessed socket 21 with a side of the orifice 81 being displaced toward the neck portion 13, thereby confining the spherical portion 11 to the recessed socket 21, as shown in FIG. 3. The body 3 has a first axis which is coaxially with a second axis of the latching plate 7, both axes being shown coaxial on line A—A in FIG. 1.

In an actual application of the present invention, the device 1 is welded or otherwise secured to a gooseneck drawbar of a trailer (not shown) such that the axis AA is generally vertically oriented. The handle 71 is cranked downwardly to withdraw the distal end 53 from the bores 55, 57 and 58, and is rotated clockwise, as viewed downwardly along the plunger 45. As the handle 71 is so rotated, the distal end 53 bears against the groove side 41, causing the topwalls 35 and 37, the spacing walls 31 and 33, and the latching plate 7 connected thereto to be rotated clockwise as a unit, as viewed downward along the axis AA. As the handle 71 is in the unlatched configuration, as shown in FIG. 5, the orifice 81 is aligned with the socket opening 22. The device 1 is then generally lowered over the spherical portion 11 of the hitch 9 secured to the towing vehicle 10 such that the spherical portion 11 is received through the orifice 81 and into the recessed socket 21, as shown in FIG. 7.

The handle 71 is then rotated counter-clockwise to the latched configuration, as shown in FIG. 1. As the handle 71 is so rotated, the distal end 53 bears against the groove side 40, causing the topwalls 35 and 37, the spacing walls 31 and 33, and the latching plate 7 to be rotated counterclockwise as a unit, as viewed downward along the axis AA. As the distal end 53 passes over the bore 55, the spring 61 automatically urges the distal end 53 downwardly through the bores 55, 57 and 58, thereby locking the orientation of the latching plate 7 relative to the bottom wall 15 whereat the orifice 81 is mismatched with the recessed socket 21 confining the spherical portion 11 to the recessed socket 21, as shown in FIG. 3.

2. Modified Embodiment of the Invention

A modified gooseneck trailer coupler device in accordance with the present invention is shown in FIGS. 8 through 12 and is generally designated by the reference numeral 100. Many of the characteristics of the modified device 100 are substantially similar to those previously described for the device i and are not reiterated here in detail.

The device 100 includes a body 103, having an upstanding tube 105 and a bottom wall 107, and latching means, such as a latching mechanism 109 in conjunction With a latching plate 111. The tube 105 is generally cylindrically shaped and is dimensioned to be slidably insertable in a gooseneck trailer drawbar 113 and fixedly secured thereto, such as by a bolt 115 threadedly advanced in a tapped bore 117, or other suitable means.

The bottom wall 107, which is fixedly secured to the lower end of the tube 105, has an upwardly recessed socket 119 with a downwardly directed socket opening 120 formed therein. The socket 119 is dimensioned such that a ball or spherical portion 121 of a hitch 123 is slidably receivable vertically therein. The bottom wall 107 extends radially beyond the tube 105 to form a first extension or pivot tab 125 and a first guide tab 127.

The latching plate 111 has a second extension or pivot tab 129 and a second guide tab 131 with a profile similar to that of the bottom wall 107, but with the second guide tab 131 wider than the first guide tab 127, as shown in FIG. 10.

The second pivot tab 129 is pivotally connected to the first pivot tab 125, such as by a generally vertically oriented pin 133. A pair of opposing spacing walls 135 and 137 are fixedly connected to the second guide tab 131 and a topwall 139 is fixedly connected to the spacing walls 135 and 137, such that the first guide tab 127 is slidable horizontally between the topwall 139 and the second guide tab 131, as shown in FIG. 10. The topwall 139 has a groove 141, having groove walls 143 and 145, which is generally radially oriented relative to the axis BB of the tube 105.

The latching mechanism 109 includes a housing 151 and a plunger 153. The housing 151 is fixedly secured to a peripheral surface 155 of the tube 105 and has a pair of throughbores 157, one in an upper wall 158a thereof and the other in a lower wall 158b thereof, with a common axis which is generally parallel to the axis BB. The plunger 153 has a linear portion 159, which is slidably and rotatably secured in the bores 157, and an elbow portion 161. The elbow portion 161 has a distal end 163, which is dimensioned relative to the groove 141 such that the distal end 163 is easily slidable along the groove 141 between the groove walls 143 and 145.

A throughbore 165, positioned near the inner end of the groove 141, is coaxially aligned with a throughbore 167 in the second guide tab 131. The first guide tab 127 has a throughbore 169 which is coaxially aligned with the bores 165 and 167 as the device 100 is in a latched configuration, as shown in FIG. 8. The bores 165, 167 and 169 are dimensioned such that the elbow distal end 163 is easily slidable axially therethrough, locking the device 100 in the latched configuration.

A compression spring 171 encircles the linear portion 159 within the housing 151 and is confined between the upper wall 158a of the housing 151 and a stop 175, which is fixedly secured to the linear portion 159 such that the plunger 153 is biased downwardly by the spring 171. A handle 179 is fixedly secured to an upper end of the plunger 153 such that as the handle 179 is displaced as shown in FIG. 8, the distal end 163 is disposed in the bores 165, 167 and 169 and the device 100 is locked in the latched configuration as aforesaid. The linear portion 159 is configured relative to the housing 151 such that as the handle 179 is manually displaced to an unlocked position, as shown in FIG. 11, the plunger 153 is sufficiently urged upwardly against the spring 171 whereby the distal end 163 is withdrawn from the bores 165, 167 and 169.

The latching plate 111 has an orifice 181 which is dimensioned and spaced such that as the handle 179 is in a hitching or unlatched position, as shown in FIG. 11, the orifice 181 is aligned with the recessed socket 119 such that the spherical portion 121 is insertable vertically through the orifice 181 to be received by the recessed socket 119. As the handle 179 is in the latched position, the orifice 181 is mismatched with the recessed socket 119 with a side of the orifice 181 being displaced toward a neck portion 183 of the hitch 123, thereby confining the spherical portion 121 to the recessed socket 119, as shown in FIG. 9. For the device 100, it is to be understood that the recessed socket 119 does not have to be spaced off-center as shown, but can be coaxial with the axis BB. In an actual application of the present invention, the device 100 is secured to the gooseneck trailer drawbar 113 such that the axis BB is generally vertically oriented. The handle 179 is manually urged upwardly to withdraw the distal end 163 from the bores 165, 167 and 169, and is rotated clockwise, as viewed downwardly along the axis BB and as indicated by the arrow designated by the numeral 185 in FIG. 10. As the handle 179 is so rotated, the distal end 163 bears against the groove wall 143 such that the topwall 139 and the latching plate 111 connected thereto are similarly displaced as indicated by the arrows designated by the numeral 187 in FIG. 10.

As the handle 179 is in the unlatched position, the orifice 181 is aligned with the recessed socket 119. The device 100 is then generally lowered over the hitch 123 secured to a towing vehicle 189 such that the spherical portion 121 is received through the orifice 181 and into the recessed socket 119, as shown in FIG. 11.

As the handle 179 is then rotated counter-clockwise, the distal end 163 bears against the groove wall 145 urging the topwall 139 and the latching plate 111 connected thereto in a counter-clockwise direction. As the distal end 163 passes over the bore 165, the spring 171 automatically urges the distal end 163 downwardly through the bores 165, 167 and 169, thereby locking the orientation of the latching plate 111 relative to the bottom wall 107 whereat the orifice 181 is mismatched with the recessed socket 119, confining the spherical portion 121 to the recessed socket 119, as shown in FIG. 9. Preferably, the handle 179 is sufficiently massive that, after seating the recessed socket 119 on the spherical portion 121, simply slapping the handle 179, such that the handle 179 rotates counter-clockwise, Will cause the device 100 to return to its latched configuration and automatically lock in that position without further assistance.

It is to be understood that while certain forms of the present invention have been illustrated and described herein, it is not to be limited to the specific forms or arrangement of parts described and shown.

What is claimed and desired to be secured by Letters Patent is as follows:

1. A coupler for connecting a gooseneck trailer to a ball hitch on a towing vehicle, comprising:
    (a) a body having a vertically oriented first axis, and a oriented bottom wall; said bottom wall having a recessed socket with a downwardly directed socket opening for receiving the ball hitch;
    (b) a latching plate having an orifice with dimensions similar to those of said socket opening; said latching plate connected to said body such that said latching plate rotates about a second axis, which is generally parallel to said first axis, and cooperates with said recessed socket to provide:
        (1) an unlatched configuration for receiving the ball hitch into said recessed socket, and
        (2) a latched configuration for confining the ball hitch to said recessed socket; and
    (c) a latching mechanism for positioning said latching plate in said latched and unlatched configurations;
    (d) said first axis and said second axis are coaxial; and
    (e) said socket opening and said orifice are offset from said first axis.

2. The coupler according to claim 1, wherein:
    (a) said latching plate is spaced below said bottom wall in slidable, face-to-face abutting relationship thereto.

3. The coupler according to claim 1, wherein:
    (a) said second axis is substantially offset from said first axis.

4. The coupler according to claim 2, wherein:
    (a) said body means has a tubular portion extending upwardly from said bottom wall;
    (b) said bottom wall has a pair of opposing first tabs extending radially outward from said tubular portion; and
    (c) said latching plate has a pair of opposing second tabs extending radially outward beyond said first tabs; at least one of said second tabs having a vertically oriented spacing wall connected thereto, and a horizontally oriented topwall connected to said spacing wall; each said topwall terminating in proximity to said tubular portion and spaced from respective said second tab such that respective said first tab is horizontally slidable between respective said topwall and said second tab.

5. The coupler according to claim 4, wherein:
    (a) said latching mechanism includes:
        (1) a housing fixedly secured to said tubular portion; said housing positioned generally above one of said first tabs; said housing having an upper wall and a pair of coaxial housing throughbores aligned parallel to said first axis;
        (2) a groove in one of said top walls;
        (3) a pair of coaxial latching plate throughbores, one in said groove and the other therebelow in respective said second tab;
        (4) a throughbore in one of said first tabs for cooperative alignment with said latching plate throughbores as said coupler is in said latched configuration; and
        (5) a plunger having a linear portion slidably and rotatably secured in said housing throughbores, an elbow portion, and a distal end adapted to be slidable along said groove and insertable through said latching plate bores and said first tab bore as said coupler is in said latched configuration.

6. The coupler according to claim 4, wherein:
    (a) each of said pair of second tabs has one of said spacing walls with said one of said topwalls connected thereto such that said pair of first tabs are horizontally slidable therebetween.

7. The coupler according to claim 5, including:
    (a) a locking mechanism for automatically and releasably locking said latching plate in said latched configuration.

8. The coupler according to claim 7, wherein:
    (a) said locking mechanism includes:
        (1) a stop fixedly secured to said plunger within said housing; and (2) a spring confined between said stop and said housing upper wall such that said plunger is biased downwardly by said spring.

9. The coupler according to claim 8, including:
(a) a handle pivotally secured to an upper extremity of said plunger; said handle having a cam adapted to overcome said bias of said spring such that said plunger distal end is withdrawable from said latching plate bores and said first tab bore as said coupler is in said latched configuration.

10. A kit for a coupler with a gooseneck trailer having a drawbar and for connection to a hitch ball of a towing vehicle, comprising:
(a) a body having a tubular portion with a vertically oriented first axis and a horizontally oriented bottom wall with a downwardly directed socket with a socket opening for receiving the ball-type hitch; said tubular portion adapted to be attached to the drawbar;
(b) a latching plate having an orifice with dimensions similar to those of said socket opening; said latching plate rotatably mounted below said bottom wall in face-to-face abutting relationship therewith such that said orifice aligns with said socket opening in an unlatched configuration and misaligns with said socket opening in a latched configuration such that the hitch ball is confinable therein;
(c) a latching mechanism for positioning said latching plate in said latched and unlatched configurations;
(d) a locking mechanism for automatically locking said latching plate in said latched configuration; and
(e) said socket opening and said orifice are offset from said first axis.

11. The kit according o claim 10, wherein:
(a) said bottom wall has a first pivot tab extending radially outwardly from said tubular portion; and
(b) said latching plate has a second pivot tab alongside said first pivot tab in abutting face-to-face relationship thereto; said second pivot tab pivotally connected to said first pivot tab about a generally vertically oriented axis.

12. A coupler device for connecting a gooseneck trailer drawbar to a hitch on a towing vehicle wherein the hitch has a spherical portion, comprising:
(a) a tubular portion having a vertically oriented axis and a peripheral surface; said tubular portion adapted to be slidably inserted in and secured to the drawbar;
(b) a horizontally oriented bottom wall fixedly secured to a lower extremity of said tubular portion;
(c) a recessed socket formed in said bottom wall; said recessed socket downwardly directed and having a socket opening; said recessed socket dimensioned and adapted to receive the spherical portion therein; said recessed socket offset from said first axis;
(d) a pair of opposing first tabs fixedly secured to and extending radially outwardly from said bottom wall;
(e) a latching plate spaced below and in slidable and abutting face-to-face relationship with said bottom wall;
(f) a pair of opposing second tabs fixedly secured to an extending radially outwardly from said latching plate; said second tabs extending beyond said first tabs;
(g) a spacing wall fixedly connected to and extending vertically from each one of said second tabs; each said spacing wall spaced radially outwardly from respective said first tab;
(h) a topwall fixedly connected to and extending horizontally from each one of said spacing walls; each said topwall terminating in close proximity to said peripheral surface; each said topwall spaced from respective said second tab such that respective said first tab is slidable therebetween;
(i) an orifice in said latching plate; said orifice having dimensions similar to those of said socket opening; said orifice adapted to align with said socket opening as said device is in an unlatched configuration and to misalign with said socket opening as said device is in a latched configuration such that the spherical portion is confinable to said recessed socket;
(j) an upwardly directed and radially oriented groove formed in one of said topwalls;
(k) a housing having an upper wall with a first throughbore and a lower wall with a second throughbore; said first throughbore aligned vertically and coaxially with said second throughbore;
(l) a plunger having a linear portion and an elbow portion with a vertically oriented distal end; said linear portion slidably and pivotally mounted in said first and second throughbores; said distal end adapted and dimensioned to be slidable along said groove;
(m) a stop fixedly secured to said linear portion within said housing;
(n) a spring encircling said linear portion and confined between said upper wall and said stop such that said plunger is biased downwardly;
(o) a third throughbore spaced near an inner end of said groove;
(p) a fourth throughbore in said second tab spaced below said groove; said fourth throughbore aligned vertically and coaxially with said third throughbore;
(q) a fifth throughbore in said first tab spaced below said groove; said fifth throughbore aligned vertically and coaxially with said third and fourth throughbores as said device is in said latched configuration; said third, fourth and fifth throughbores dimensioned to receive said distal end axially therethrough;
(r) a handle pivotally connected to said plunger above said upper wall about a horizontal axis; said handle adapted to position said device in said latched and unlatched configurations; and
(s) a cam fixedly secured to said handle, said cam adapted, in cooperation with said upper wall; to urge the plunger upwardly against said bias of said spring such that said distal end is elevated above said third throughbore.

13. A coupler device for connecting a gooseneck trailer drawbar to a hitch on a towing vehicle wherein the hitch has a spherical portion, comprising:
(a) a tubular portion having a vertically oriented first axis and a peripheral surface; said tubular portion adapted to be slidably inserted in and secured to the drawbar;
(b) a horizontally oriented bottom wall fixedly secured to a lower extremity of said tubular portion;
(c) a recessed socket formed in said bottom wall; said recessed socket generally downwardly directed and having a socket opening; said recessed socket dimensioned and adapted to receive the spherical portion therein;

(d) a first guide tab and a first pivot tab fixedly secured to and extending radially outwardly from said bottom wall;

(e) a latching plate spaced below and in slidable and abutting face-to-face relationship with said bottom wall;

(f) a second guide tab and a second pivot tab fixedly secured to and extending radially outwardly from said latching plate; said second pivot tab pivotally connected to said first pivot tab about a vertically oriented second axis;

(g) a pair of radially-oriented spacing walls fixedly connected to and extending vertically from opposing sides of said second guide tab;

(h) a topwall fixedly connected to and extending horizontally between said spacing walls; said topwall spaced in close proximity to said peripheral surface; said topwall spaced from said second guide tab such that said first guide tab is slidable therebetween (i) an orifice in said latching plate; said orifice having dimensions similar to those of said socket opening; said orifice adapted to align with said socket opening as said device is in an unlatched configuration and to misalign with said socket opening as said device is in a latched configuration such that the spherical portion is confinable to said recessed socket;

(j) an upwardly directed and radially oriented groove formed in said topwall;

(k) a housing having an upper wall with a first throughbore and a lower wall with a second throughbore; said first throughbore aligned vertically and coaxially with said second throughbore;

(l) a plunger having a linear portion and an elbow portion with a vertically oriented distal end; said linear portion slidably and pivotally mounted in said first and second throughbores; said distal end adapted and dimensioned to be slidable along said groove;

(m) a stop fixedly secured to said linear portion within said housing;

(n) a spring encircling said linear portion and confined between said upper wall and said stop such that said plunger is biased downwardly;

(o) a third throughbore spaced near an inner end of said groove;

(p) a fourth throughbore in said second guide tab; said fourth throughbore aligned vertically and coaxially with said third throughbore;

(q) a fifth throughbore in said first guide tab; said fifth throughbore aligned vertically and coaxially with said third and fourth throughbores as said device is in said latched configuration; said third, fourth and fifth throughbores dimensioned to receive said distal end axially ther through; and (r) a handle connected to said plunger above said upper wall; said handle adapted to position said device in said latched and unlatched configurations; said handle adapted to urge the plunger upwardly against said bias of said spring such that said distal end is elevated above said third throughbore.

* * * * *